US012645240B2

(12) United States Patent
Migliavacca

(10) Patent No.: US 12,645,240 B2
(45) Date of Patent: Jun. 2, 2026

(54) VOLTAGE REGULATOR WITH CURRENT LIMITER CIRCUITRY

(71) Applicant: NXP USA, Inc., Austin, TX (US)

(72) Inventor: Paolo Migliavacca, Mauzac (FR)

(73) Assignee: NXP USA, Inc., Austin, TX (US)

( * ) Notice: Subject to any disclaimer, the term of this patent is extended or adjusted under 35 U.S.C. 154(b) by 232 days.

(21) Appl. No.: 18/642,418

(22) Filed: Apr. 22, 2024

(65) Prior Publication Data

US 2025/0199553 A1 Jun. 19, 2025

(30) Foreign Application Priority Data

Dec. 19, 2023 (EP) .................................... 23307254

(51) Int. Cl.
*G05F 1/573* (2006.01)
*G05F 1/575* (2006.01)
*G05F 3/26* (2006.01)

(52) U.S. Cl.
CPC .............. *G05F 1/573* (2013.01); *G05F 3/267* (2013.01); *G05F 1/575* (2013.01)

(58) Field of Classification Search
CPC ................................ G05F 1/573; G05F 1/575
See application file for complete search history.

(56) References Cited

U.S. PATENT DOCUMENTS 5,539,603 A 7/1996 Bingham
8,072,196 B1 12/2011 Li
8,169,203 B1 * 5/2012 Vemula .................. G05F 1/575 323/273
8,508,199 B2 8/2013 Arigliano et al.
9,075,422 B2 7/2015 Vemula
9,170,594 B2 10/2015 Bhattad et al.
9,625,925 B2 4/2017 Yan et al.
10,073,478 B1 * 9/2018 Ivanov .................... G05F 1/595
10,761,550 B2 * 9/2020 Sorace .................... G05F 1/575
10,895,884 B2 1/2021 Kotrc et al.
10,942,535 B2 * 3/2021 Sivaraj .................... G05F 1/569
2017/0322573 A1 11/2017 Bhattad et al.
2021/0018944 A1 * 1/2021 Matyscak ............... G05F 1/565
2021/0124383 A1 * 4/2021 Iguchi ..................... G05F 1/565

FOREIGN PATENT DOCUMENTS

CN 109213255 B 1/2019

* cited by examiner

*Primary Examiner* — Gary A Nash
(74) *Attorney, Agent, or Firm* — Andrew C. Milhollin

(57) ABSTRACT

A voltage regulation circuit and method of operation are described, where the voltage regulation circuit includes an error amplifier configured to provide an error signal based on a comparison of a reference voltage and a voltage at a first voltage divider coupled to an output node of the voltage regulation circuit, a pass transistor configured to selectively pass current from an input node to the output node based, at least in part, on the error signal, current limiter circuitry including a current limiting transistor that is configured to limit electrical current through the pass transistor, and logic circuitry configured to configure the current limiting transistor as a diode-connected transistor in a first state and configure the current limiting transistor as part of a current control loop in a second state.

20 Claims, 6 Drawing Sheets

VOLTAGE REGULATOR WITH CURRENT LIMITER CIRCUITRY

CROSS-REFERENCE TO RELATED APPLICATIONS

This application claims priority under 35 U.S.C. § 119 to patent application Ser. No. 23/307,254.5, filed Dec. 19, 2023, the contents of which are incorporated by reference herein.

TECHNICAL FIELD

Embodiments of the subject matter described herein relate generally to regulators, including low-dropout regulators with current limiter circuitry.

BACKGROUND

Linear voltage regulators, such as low-dropout (LDO) regulators, generate a regulated direct current (DC) output voltage from a received supply voltage. LDO regulators, in particular, are used in many applications because of its ability to linearly regulate output voltage, even when the supply voltage is very close to the output voltage. LDOs tend to generate less noise and may be smaller than other types of regulators.

SUMMARY

A brief summary of various exemplary embodiments is presented below. Some simplifications and omissions may be made in the following summary, which is intended to highlight and introduce some aspects of the various exemplary embodiments, without limiting the scope. Detailed descriptions of an exemplary embodiment adequate to allow those of ordinary skill in the art to make and use these concepts will follow in later sections.

In an example embodiment, a voltage regulation circuit includes an error amplifier configured to provide an error signal based on a comparison of a reference voltage and a voltage at a first voltage divider coupled to an output node of the voltage regulation circuit, a pass transistor configured to selectively pass current from an input node to the output node based, at least in part, on the error signal, current limiter circuitry including a current limiting transistor that is configured to limit electrical current through the pass transistor, and logic circuitry configured to configure the current limiting transistor as a diode-connected transistor in a first state and configure the current limiting transistor as part of a current control loop in a second state.

In one or more embodiments, the first state is a startup state in which an output voltage at the output node is less than a predetermined threshold voltage.

In one or more embodiments, the error amplifier is disabled during the startup state.

In one or more embodiments, the current limiter circuitry further includes a first switch coupled between a gate terminal of the current limiting transistor and a drain terminal of the current limiting transistor. The logic circuitry is configured to close the first switch in the first state and to open the first switch in the second state.

In one or more embodiments, the current control loop includes a first transistor coupled between the input node and the current limiting transistor, a second transistor coupled between the current limiting transistor and a reference node, a second voltage divider coupled between the input node and the output node, where a gate terminal of the second transistor is connected to an intermediate node of the second voltage divider, and a third transistor coupled between the input node and the voltage divider, where a gate terminal of the third transistor is connected to respective drain terminals of the first transistor and the current limiting transistor.

In one or more embodiments, the current limiter circuitry further includes a second switch coupled between the second transistor and the reference node. The logic circuitry is configured to open the second switch in the first state and close the second switch in the second state.

In one or more embodiments, the logic circuitry is configured to transition from the first state to the second state in response to determining that the output voltage at the output node is greater than a predetermined threshold voltage.

In one or more embodiments, the current limiter circuitry further includes a current mirror that includes the second transistor of the current control loop and a fourth transistor, and a constant current source configured to provide a constant current through the fourth transistor. The constant current source includes a bipolar junction transistor (BJT) coupled between the input node and the reference node and a resistor connected between a base terminal of the BJT and the reference node.

In an example embodiment, a low-dropout regulator includes a first transistor coupled between an input node and an output node, an amplifier configured to control the first transistor based on an output voltage at the output node and a reference voltage, current limiter circuitry including a second transistor that is configured to limit electrical current through the first transistor, and logic circuitry configured to configure the second transistor as a diode-connected transistor in a first state, and connect the second transistor to a current control loop in a second state.

In one or more embodiments, the amplifier is disabled during the first state.

In one or more embodiments, the current limiter circuitry further includes a first switch coupled between a gate terminal of the second transistor and a drain terminal of the second transistor. The logic circuitry is configured to close the first switch in the first state and to open the first switch in the second state.

In one or more embodiments, the current control loop includes a third transistor coupled between the input node and the second transistor, a fourth transistor coupled between the second transistor and a reference node, a voltage divider coupled between the input node and the output node, where a gate terminal of the fourth transistor is connected to an intermediate node of the voltage divider, and a fifth transistor coupled between the input node and the voltage divider, where a gate terminal of the fifth transistor is connected to respective drain terminals of the third transistor and the second transistor.

In one or more embodiments, the current limiter circuitry further includes a second switch coupled between the fourth transistor and the reference node. The logic circuitry is configured to open the second switch in the first state and close the second switch in the second state.

In one or more embodiments, the logic circuitry is configured to transition from the first state to the second state in response to determining that the output voltage at the output node is greater than a predetermined threshold voltage.

In one or more embodiments, the current limiter circuitry further includes a current mirror that includes the fourth transistor of the current control loop and a sixth transistor, and a constant current source configured to provide a constant current through the sixth transistor. The constant current source includes a bipolar junction transistor (BJT) coupled between the input node and the reference node, and a resistor connected between a base terminal of the BJT and the reference node.

In an example embodiment, a method includes configuring, by logic circuitry of a low-dropout regulator in a first state, a current limiting transistor as a diode-connected transistor, configuring, by the logic circuitry in a second state, the current limiting transistor to be included in a current control loop without being configured as a diode-connected transistor, and limiting, by the current limiting transistor in the first state and in the second state, current through a pass transistor coupled between an input node of the low-dropout regulator and an output node of the low-dropout regulator.

In one or more embodiments, the method further includes transitioning, by the logic circuitry, from the first state to the second state in response to determining that an output voltage of the low-dropout regulator is greater than a predetermined threshold voltage.

In one or more embodiments, configuring the current limiting transistor as a diode-connected transistor includes closing, by the logic circuitry a first switch that is connected between a gate terminal of the current limiting transistor and a drain terminal of the current limiting transistor.

In one or more embodiments, configuring the current limiting transistor to be included in a current control loop without being configured as a diode-connected transistor includes opening, by the logic circuitry, the first switch, and closing, by the logic circuitry, a second switch that is connected between at least one transistor of the current control loop and a reference node.

In one or more embodiments, the method further includes providing, by a constant current source coupled between the input node and the output node, a constant current through the current limiting transistor in the first state and in the second state via a current mirror.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures. Elements in the figures are illustrated for simplicity and clarity and have not necessarily been drawn to scale. The figures along with the detailed description are incorporated and form part of the specification and serve to further illustrate examples, embodiments and the like, and explain various principles and advantages, in accordance with the present disclosure, wherein:

DETAILED DESCRIPTION

Figure 1:
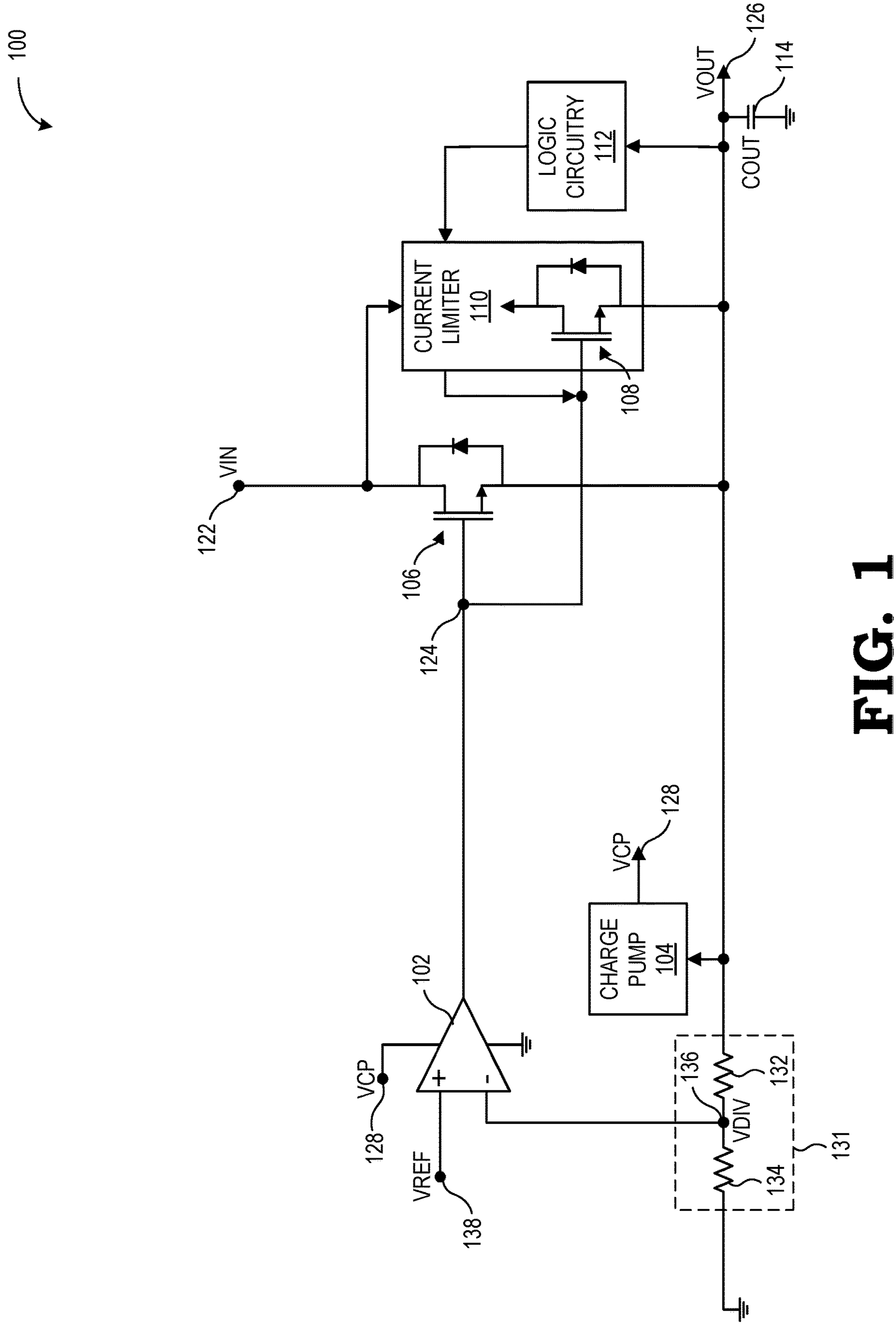
FIG. 1 is a block diagram of an illustrative low-dropout (LDO) regulator with current limiter circuitry, in accordance with various embodiments.

The following detailed description is merely illustrative in nature and is not intended to limit the embodiments of the subject matter or the application and uses of such embodiments. Furthermore, there is no intention to be bound by any expressed or implied theory presented in the preceding technical field, background, or the following detailed description.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements or regions in the figures may be exaggerated relative to other elements or regions to help improve understanding of embodiments described herein.

The terms “first,” “second,” “third,” “fourth” and the like in the description and the claims, if any, may be used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms “comprise,” “include,” “have” and any variations thereof, are intended to cover non-exclusive inclusions, such that a process, method, article, or apparatus that comprises a list of elements is not necessarily limited to those elements but may include other elements not expressly listed or inherent to such process, method, article, or apparatus. The term “coupled,” as used herein, is defined as directly or indirectly connected in an electrical or non-electrical manner. As used herein the terms “substantial” and “substantially” mean sufficient to accomplish the stated purpose in a practical manner and that minor imperfections, if any, are not significant for the stated purpose. As used herein, the words “exemplary” and “example” mean “serving as an example, instance, or illustration.” Any implementation described herein as exemplary or an example is not necessarily to be construed as preferred or advantageous over other implementations. In addition, certain terms may also be used herein for reference only, and thus are not intended to be limiting.

Directional references such as “top,” “bottom,” “left,” “right,” “above,” “below,” and so forth, unless otherwise stated, are not intended to require any preferred orientation and are made with reference to the orientation of the corresponding figure or figures for purposes of illustration.

Various embodiments described herein relate to voltage regulators, such as low-dropout (LDO) regulators with current limiter circuitry that is configured to perform different functions in different states. For example, a current limiter circuitry may be configured to control charging current to an output capacitor of an LDO regulator in a startup state, and may be configured to provide current limitation for a power transistor (sometimes referred to herein as a "pass transistor") of the LDO regulator in a current regulation state.

In conventional voltage regulators, a first set of dedicated circuitry is used for providing current protection during startup, and a distinct second set of dedicated circuitry is used for providing current protection during subsequent operation of the regulator. Additionally, the dedicated current protection circuitry used during startup in such conventional voltage regulators typically requires the activation of a comparator or another amplifier to provide current limitation functionality, which results in longer startup times. Such conventional voltage regulators are typically susceptible to current overshoot, particularly when a battery voltage supplying the conventional voltage regulator increases in a slow or irregular manner during startup. In contrast to such conventional approaches, the embodiments of the current limiter circuitry of the voltage regulators described herein do not require the activation of a comparator or amplifier, and therefore achieves a comparatively faster startup. Embodiments of the present current limiter circuitry may be operable even when a battery voltage used to supply the voltage regulator that includes the current limiter circuitry is increasing slowly or irregularly. Further, embodiments of voltage regulators described herein use a single set of current limiter circuitry for both startup state and current regulation state current limitation, which provides advantageous size reduction and simplified design and optimization compared to conventional voltage regulators that use distinct sets of circuitry for startup current protection and subsequent current regulation.

In one or more embodiments, an illustrative voltage regulator may include an error amplifier, current limiter circuitry, a pass transistor, and a current limiting transistor. In a startup state, the configuration of the current limiter circuitry causes the current limiting transistor to be configured as a diode-connected transistor (i.e., where the gate terminal of the current limiting transistor is connected to the drain terminal of the current limiting transistor), the gate terminals of the current limiting transistor and the pass transistor are connected, and a current mirror arrangement may provide a reference current through the current limiting transistor. The reference current through the current limiting transistors controls (i.e., limits) the current through the pass transistor. The respective currents through the current limiting transistor and the pass transistor charges an output capacitor coupled to the output of the voltage regulator.

When the output voltage at the output of the voltage regulator exceeds a threshold, undervoltage lockout circuitry that is coupled to the output of the voltage regulator may modify the configuration of the current limiter circuitry (e.g., changing the respective states of switches thereof), and the voltage regulator enters a current regulation state. In the current regulation state, the current limiting transistor is switched out of the previous arrangement (as a diode-connected transistor), and is instead arranged in a current control loop that controls the current through the current limiting transistor, which limits the current through the pass transistor. In the current regulation state, the error amplifier is turned on, and the current regulation state is maintained until the error amplifier reaches a target voltage regulation level, at which point the voltage regulator transitions to a voltage regulation state. In the voltage regulation state, the voltage regulator may regulate the output voltage to be at or above the target voltage regulation level. However, the output voltage may occasionally drop below the target voltage regulation level (sometimes referred to as "dropping out of regulation"), in response to which the current limiter circuitry and the current limiting transistor may be activated to continue to provide current limitation for the pass transistor until the output voltage increases to be greater than or equal to the target voltage regulation level, at which point the voltage regulator may return to the voltage regulation state.

FIG. 1 is a block diagram of a low-dropout (LDO) regulator 100 (sometimes referred to as a "linear regulator" or a "voltage regulation circuit") having current limiter circuitry 110 that is configured to provide current protection in both a startup state and a current regulation state of the LDO regulator 100. For example, the current limiter circuitry may have a first configuration in a startup state of the LDO regulator 100 in which the current limiter circuitry 110, using a current limiting transistor 108, controls (i.e., limits) current flow through a pass transistor 106 while charging an output capacitor 114 (COUT). The current limiter circuitry may have a second configuration in a subsequent current regulation state of the LDO regulator 100 in which the current limiter circuitry 110, using the current limiting transistor 108, controls (i.e., limits) current flow through the pass transistor 106 while the output voltage VOUT at an output node 126 of the LDO regulator 100 is ramped up to a target voltage regulation level. Herein, the term "current" is used to refer to electrical current, unless otherwise indicated. While the current limiter circuitry 110 of the present example is described with reference to an LDO regulator, it should be understood that this is intended to be illustrative and non-limiting. For example, the current limiter circuitry 110 may be used with other suitable voltage regulator arrangements, in accordance with one or more other embodiments.

As shown, the LDO regulator 100 may include an error amplifier 102, a charge pump 104, the pass transistor 106, the current limiting transistor 108, current limiter circuitry 110, logic circuitry 112, and an output capacitor 114. The LDO regulator 100 includes an input node 122 that receives a voltage VIN. In one or more embodiments, the voltage VIN may be the output voltage (sometimes referred to herein as "VBAT") of a battery that is coupled to the input node 122.

The error amplifier 102 may be a differential amplifier having a non-inverting input, and inverting input, and an output, in accordance with one or more embodiments. The non-inverting input of the error amplifier 102 may be coupled to a reference node 138 at which a reference voltage VREF is provided (e.g., by a reference voltage supply; not shown). In one or more embodiments, the reference voltage VREF may be between around 1 V to around 1.2 V, as a non-limiting example. The inverting input of the error amplifier 102 may be coupled to a node 136 of a voltage divider 131 that includes a resistor 132 having a resistance R1 and a resistor 134 having a resistance R2, where the resistors 132 and 134 are coupled in series between the output node 126 of the LDO regulator 100 and a ground or reference node, and the node 136 is coupled between the resistors 132 and 134.

The output of the error amplifier 102 may be coupled to the gate of the pass transistor 106 and the gate of the current limiting transistor 108 via the node 124. The voltage signal output by the error amplifier 102 is sometimes referred to herein as an "error signal" and may control the amount of current allowed to pass through the pass transistor 106 (i.e., from a drain terminal of the pass transistor 106 to a source terminal of the pass transistor 106; between current-carrying terminals of the pass transistor 106), thereby adjusting the voltage VOUT at the output node 126. That is, the pass transistor 106 may selectively pass current from the input node 122 to the output node 126 based on the error signal output by the error amplifier 102.

The voltage VDIV at the node 136 of the voltage divider 131 may be a fraction of the voltage VOUT that is compared to the reference voltage VREF by the error amplifier 102 to determine the output voltage of the error amplifier 102. For example, VDIV may be equal to VOUT*(R2/(R1+R2)). In this way, the error amplifier 102 may regulate the voltage VOUT at the output node 126. It should be understood that, herein, a "ground node" may refer to a node that receives or is connected to a ground voltage, common voltage, or another suitable reference potential (e.g., 0 V), in accordance with various embodiments. Herein, the "gate terminal" or "base terminal" of a transistor may sometimes be referred to as a "control terminal", and the "drain terminal" and "source terminal" of a transistor may sometimes be referred to as "current-carrying terminals."

The charge pump 104 may have an input coupled to the output node 126 and may be configured to generate and provide, at an output node 128, a voltage VCP (sometimes referred to herein as a "charge pump voltage") based on the output voltage VOUT. For example, the charge pump 104 may provide the voltage VCP to one or more elements of the LDO regulator 100, such as the error amplifier 102 as a non-limiting example. In one or more embodiments, the charge pump 104 is configured to generate the voltage VCP at a voltage level equal to or approximately equal to 10 V, as a non-limiting example. Herein, an example amount that is said to be "around" or "approximately" a given value is considered to be within +/−10% of the given value unless otherwise indicated.

The current limiter circuitry 110 includes the current limiting transistor 108, which includes a gate terminal coupled to the node 124, source terminal coupled to the output node 126, and a drain terminal coupled to the input node 122 via additional circuitry of the current limiter circuitry 110 (described in more detail below). In one or more embodiments, the pass transistor 106 and the current limiting transistor 108 may each be n-type Metal Oxide Semiconductor (nMOS) field effect transistors (FETs).

The logic circuitry 112 may have an input coupled to the output node 126, from which the logic circuitry 112 may receive the output voltage VOUT, and one or more outputs coupled to the current limiter circuitry, where the logic circuitry 112 may change a configuration of the current limiter circuitry 110 via these outputs. For example, the logic circuitry 112 may configure of the current limiter circuitry 110 based on the output voltage VOUT. In a startup state of the LDO regulator 100, the output voltage VOUT may be relatively low (e.g., ranging from 0 V to around 3 V), and the logic circuitry 112 may control the current limiter circuitry 110 to configure the current limiting transistor 108 as a diode-connected transistor (i.e., a transistor having its gate terminal connected to its drain terminal). The error amplifier 102 and the charge pump 104 may be disabled in the startup state, due to the low level of the output voltage VOUT. The gate terminals of the current limiting transistor 108 and the pass transistor 106 may be connected in the startup state, such that the current through the current limiting transistor 108 controls (i.e., limits) the current through the pass transistor 106. For example, the arrangement of the current limiting transistor 108 and the pass transistor 106 may behave similarly to a current mirror having a very unbalanced current ratio between these transistors. In the startup state, the surface ratio between the pass transistor 106 and the current limiting transistor 108 may define the ratio of the current through the pass transistor 106 to the current through the current limiting transistor 108. As a non-limiting example, the pass transistor 106 may have a channel width of 80 mm and a channel length of 1 μm and the current limiting transistor 108 may have a channel width of 8 μm and a channel length of 1 μm, resulting in a surface ratio of 10,000:1 between the pass transistor 106 and the current limiting transistor 108, allowing a 10 μA current through the current limiting transistor 108 to control a 100 mA current through the pass transistor 106. In one or more embodiments, the surface ratio between the pass transistor 106 and the current limiting transistor 108 may be between around 1,000 and around 10,000, as non-limiting examples.

In response to determining that the output voltage VOUT exceeds a predetermined threshold voltage (e.g., around 3 V), the logic circuitry 112 may change the configuration of the current limiter circuitry 110, causing the current limiting transistor 108 to be connected as part of a current control loop that provides current regulation in the current regulation state. The predetermined threshold voltage may correspond to the voltage level required to activate the error amplifier 102 (e.g., an undervoltage lockout (UVLO) voltage level associated with the error amplifier 102). For example, operation of the error amplifier 102 affects the voltage at the node 124, thereby negatively impacting the ability of the initial arrangement of the current limiting transistor 108 (arranged as a diode-connected transistor the start-up state) to limit current through the pass transistor 106, so it may be desirable to change the configuration of the current limiter circuitry 110 upon expected activation of the error amplifier 102. In the current regulation state, current through the current limiting transistor 108 may control (i.e., limit) the current through the pass transistor 106 The detection of VOUT exceeding this predetermined threshold voltage by the logic circuitry 112 may correspond to the transition from the startup state to the current regulation state, in one or more embodiments. In the current regulation state, the surface ratio between the pass transistor 106 and the current limiting transistor 108 may define the ratio of current through the pass transistor 106 to current through the current limiting transistor 108, as described above. Once the output voltage VOUT rises above a target voltage regulation level, the current limiter circuitry 110 may be disabled and the LDO regulator 100 may enter a voltage regulation state in which the error amplifier 102 maintains the output voltage VOUT at or above the target voltage regulation level. At times when the output voltage VOUT drops out of regulation during the voltage regulation state of the LDO regulator 100, due to the output voltage VOUT dropping below the target voltage regulation level, the LDO regulator 100 may return to the current regulation state and the current limiter circuitry 110 may be activated to provide current limitation for the pass transistor 106.

As illustrated in the present example, a single set of current limiter circuitry 110 is used to provide current protection for the LDO regulator 100 both when charging the output capacitor 114 in the startup state and when providing current regulation after startup and before VOUT reaches the target voltage regulation level. In this way, the footprint of current limiter circuitry in the LDO regulator 100 may be reduced, advantageously, compared to conventional approaches that rely on separate current limiter circuitries for current protection in similar states. As described in more detail below, in one or more embodiments, the arrangement of the current limiter circuitry 110 in the LDO regulator 100 may result in faster charging of the output capacitor 114, may mitigate current overshoot given a slowly or irregularly rising supply voltage (e.g., VIN, VBAT), and may allow for initiating output capacitor charging for lower supply voltage values, compared to conventional approaches.

Figure 2:
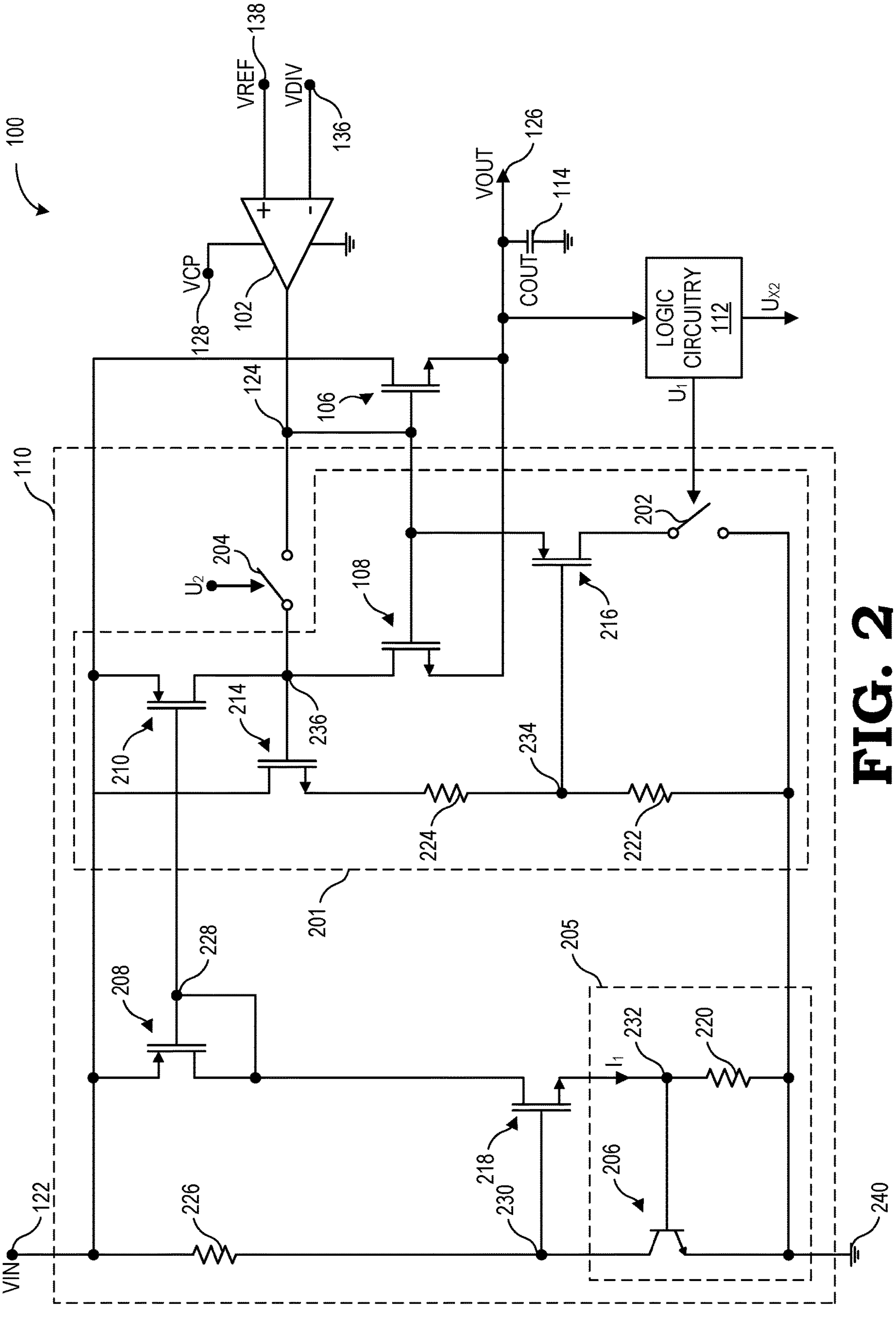
FIG. 2 is a diagram of the LDO regulator of FIG. 1, including a detailed example of the current limiter circuitry, in accordance with various embodiments.

A detailed example of circuitry that may be included in the current limiter circuitry 110 is illustrated in FIG. 2, which shows a partial view of the LDO regulator 100 of FIG. 1. It should be noted that some elements of the LDO regulator 100 (e.g., the charge pump 104 and the voltage divider 131) are not shown in the present example.

As shown in FIG. 2, the current limiter circuitry 110 may include the current limiting transistor 108, switches 202 and 204, transistors 208, 210, 214, 216, and 218 (sometimes referred to as "FETs" 208, 210, 214, 216, and 218 or "MOSFETs" 208, 210, 214, 216, and 218), a bipolar junction transistor (BJT) 206, and resistors 220, 222, 224, and 226.

The current limiting transistor 108 may be an nMOS transistor having a gate terminal coupled to a gate terminal of the pass transistor 106, the output of the error amplifier 102, a source terminal of the transistor 216, and a first terminal of the switch 204 via the node 124, a source terminal coupled to the output node 126, and a drain terminal coupled to a second terminal of the switch 204, a gate terminal of the transistor 214, and a drain terminal of the transistor 210. The switch 202 may include a first terminal coupled to a drain terminal of the transistor 216, a second terminal coupled to a reference node (e.g., at a reference potential of 0 V, ground, or another suitable reference potential), and a control terminal that receives a control signal $U_1$ from the logic circuitry 112. The switch 204 may include a first terminal coupled to the node 124, a second terminal coupled to the node 236, and a control terminal that receives a control signal $U_2$ from the logic circuitry 112.

The transistor 208 may be a p-type MOS (pMOS) transistor having a gate terminal coupled to the gate terminal of the transistor 208, its own drain terminal, and a drain terminal of the transistor 218 via the node 228, a drain terminal coupled to the node 228, and a source terminal coupled to the input node 122. The transistor 210 may be a pMOS transistor having a gate terminal coupled to the gate and drain terminals of the transistor 208 and a drain terminal of the transistor 218 via the node 228, a drain terminal coupled to the node 236, and a source terminal coupled to the input node 122. The transistor 214 may be an nMOS transistor having a gate terminal coupled to the node 236, a drain terminal coupled to the input node 122, and a source terminal coupled to the reference node 240 via the resistors 222 and 224. The transistor 216 may be a pMOS transistor having a gate terminal coupled to a node 234, a source terminal coupled to the node 124, and a drain terminal coupled to the first terminal of the switch 202. The node 234 is an intermediate node of a voltage divider formed by the resistors 222 and 224, and is interposed between terminals of the resistors 222 and 224. The transistor 218 may be an NMOS transistor having a gate terminal coupled to the input node 122 via a node 230 and the resistor 226, a drain terminal coupled to the node 228, and a source terminal coupled to the reference node 240 via a node 232 and the resistor 220. The BJT 206 may be an NPN BJT having a base terminal coupled to the node 232, an emitter terminal coupled to the reference node 240, and a collector terminal coupled to the node 230.

The resistor 220 is coupled between the node 232 and the reference node 240. The resistor 222 is coupled between the node 234 and the reference node 240. The resistor 224 is coupled between the source terminal of the transistor 214, and the node 234. The resistor 226 is coupled between the input node 122 and the node 230.

The BJT 206 may form a constant current source 205 in conjunction with the resistor 220. For example, the constant base-emitter voltage (VBE) of the BJT 206 is placed across the resistor 220, such that a constant current $I_1$ (equal to the VBE of the BJT 206 divided by the resistance of the resistor 220) is provided through the resistor 220. The current through the transistor 208 (source-to-drain) may be driven by the constant current source 205. The transistors 208 and 210 may form a current mirror, with the current through the transistor 210 (source-to-drain) may be controlled by the current through the transistor 208 (i.e., the current $I_1$ output by the constant current source 205).

In the startup state of the LDO regulator 100, the logic circuitry 112 is configured to keep the switch 202 open using the control signal $U_1$ and to keep the switch 204 is closed using the control signal $U_2$. In the current regulation state of the LDO regulator 100 (immediately following the startup state), the logic circuitry 112 is configured to keep the switch 202 closed using the control signal $U_1$ and to keep the switch 204 is open using the control signal $U_2$. Herein, a switch or transistor is considered to be "closed", "on", or "activated" when a relatively low impedance path is provided between the input terminal of the switch and the output terminal of the switch, permitting electric current to flow between its input terminal and its output terminal. Herein, a switch or transistor is considered to be "open", "off", or "deactivated" when a relatively high impedance path is provided between its input terminal and its output terminal, such that the flow of current is reduced or blocked therebetween.

In the startup state, when the switch 204 is closed and the switch 202 is open, the current limiting transistor 108 may be configured as a diode-connected transistor (i.e., having a drain terminal directly connected to its gate terminal), and may have a gate terminal that is connected to the gate terminal of the pass transistor 106. In this arrangement, the current $I_1$ generated by the current source 205 may cause a corresponding current to be provided to the current limiting transistor 108 via the current mirror formed from the transistors 208 and 210. The current through the current limiting transistor 108 may control (i.e., limit) the current through the pass transistor 106. In one or more embodiments, the current through the current limiting transistor 108 may control a comparatively larger current (e.g., with between a 1000:1 and a 10,000:1 ratio between the pass transistor 106 current and the current limiting transistor 108 current, as a non-limiting example) through the pass transistor 106, which may be defined by the surface ratio between the pass transistor 106 and the current limiting transistor 108. In this way, the current limiter circuitry 110 may limit the current through the pass transistor 106 in the startup state. Additionally, the current limiter circuitry 110 may not require internal capacitor charging or activation of a comparator or other amplifier, in accordance with one or more embodiment, such that the time between initiation of the startup state and the current through the pass transistor 106 reaching the current limit set by the current limiter circuitry 110 may be advantageously reduced (e.g., from around 60 μs to around 3 μs in one or more embodiments) compared to conventional approaches that do require such charging or activation. Further, the current source 205 and the current limiting transistor 108, when configured as a diode-connected transistor, may be operable at relatively low levels of VIN (e.g., around 1 V, although current limitation by the current limiter circuitry 110 may be active at even lower values of VIN in accordance with one or more embodiments), such that the LDO regulator 100 may be operable in the startup state even when VIN corresponds to a relatively low battery voltage, thereby allowing for quicker initiation of the startup state during ramp-up of such a battery.

In the current regulation state, when the switch 204 is open and the switch 202 is closed by the logic circuitry 112, the transistors 108, 210, 214, and 216 and the resistors 224 and 222 form a current control loop 201. In one or more embodiments, the logic circuitry 112 may modify a configuration of the current limiter circuitry 110 such that the current limiting transistor 108 is no longer configured as a diode-connected transistor and is instead included in the current control loop 201. The current control loop 201 defines the voltage at the node 124, which acts as the gate voltage for the pass transistor 106 and the gate voltage for the current limiting transistor 108. The current through the current limiting transistor 108 is equal to or approximately equal to the current through the transistor 210, which is still dependent on the current $I_1$ from the current source 205, in the current regulation state. The voltage at the node 124 is maintained by the transistor 216 and, when on, the output of the error amplifier 102, in order to maintain the current through the current limiting transistor 108. The current through the current limiting transistor 108, when included in the current control loop 201, may control (i.e., limit) the current through the pass transistor 106. In one or more embodiments, in the current regulation state, the current control loop 201 may be configured to apply a current limit to the pass transistor 106 at a level that is similar to the current limit applied to the pass transistor 106 during the startup state, at least while VOUT is lower than the target voltage regulation level.

Figure 3:
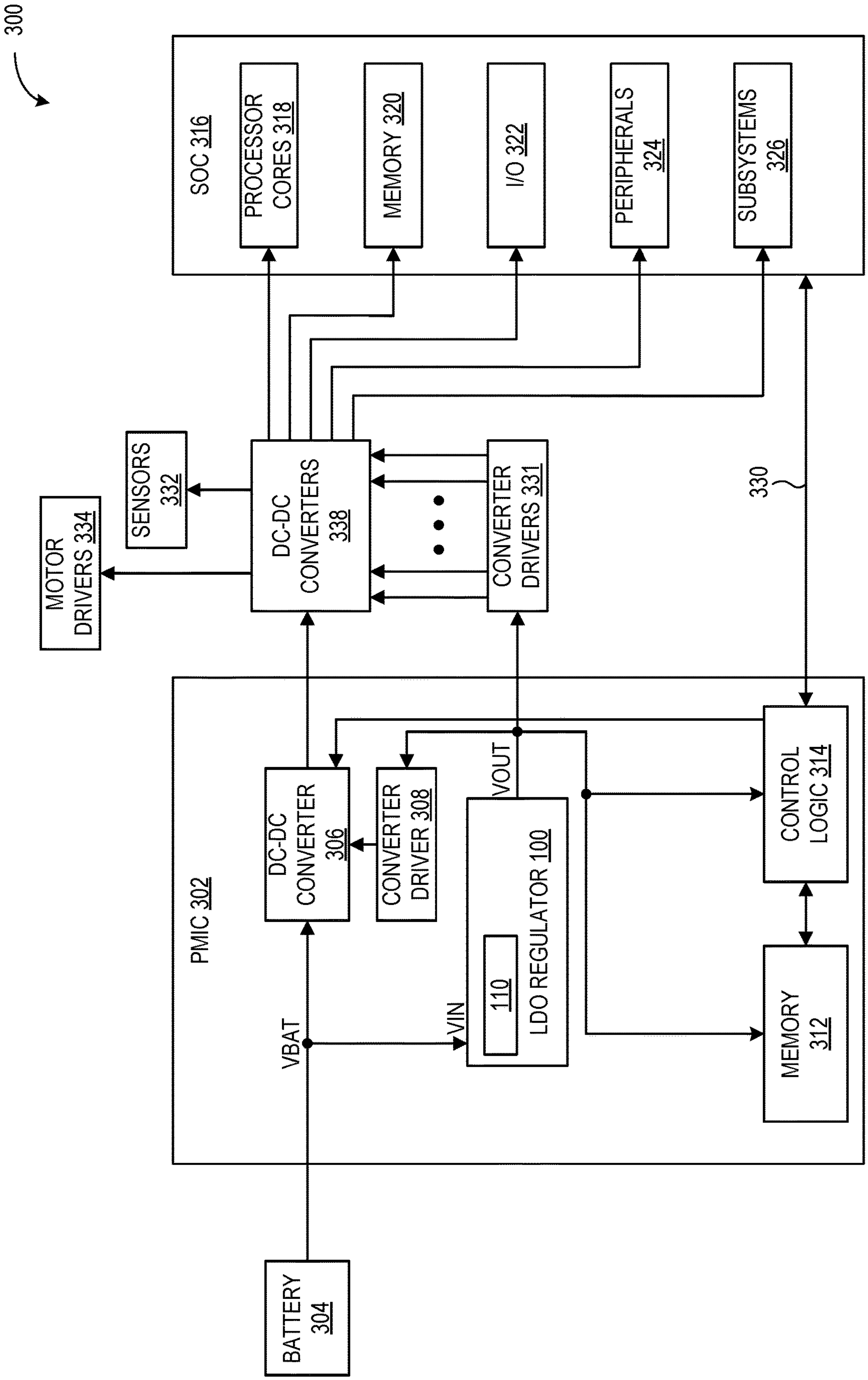
FIG. 3 is a block diagram of an illustrative system having a power management integrated circuit (PMIC) that includes the LDO regulator of FIG. 1, in accordance with various embodiments.

FIG. 3 shows an example of a system 300 that includes a power management integrated circuit (PMIC) 302, a battery 304, and a system-on-chip (SOC) 316. In the present example, the PMIC 302 includes, as a voltage regulation circuit, an embodiment of the LDO regulator 100 of FIG. 1. In one or more embodiments, the system 300 is an automotive system and the SOC 316 is an automotive SOC. In the present example, reference is made to the LDO regulator 100 of FIG. 1, where like elements are denoted using like reference numerals.

The PMIC 302 may include a DC-DC converter 306, the LDO regulator 100, a converter driver 308, a memory 312, and control logic 314. The LDO regulator 100 may provide a regulated output voltage VOUT that powers one or more of converter driver 308, the memory 312, and the control logic 314. The DC-DC converter 306 may receive a voltage VBAT (e.g., around 12V to around 48 V as a non-limiting example) and may generate a voltage (e.g., around 6 V to 10 V, as a non-limiting example) by stepping down the voltage VBAT. The control logic 314 may communicate with the SOC 316 over an interface 330, and may control the DC-DC converter to scale up or scale down the voltage output by the DC-DC converter based on instructions received from the SOC 316. In one or more embodiments, the memory 312 includes a one-time programmable (OTP) memory that can provide pre-set limits for voltage ranges and other parameters. For one or more embodiments in which the system 300 is an automotive system, the pre-set limits of the OTP memory of the memory 312 may be stored by the manufacturer of the PMIC or by a manufacturer of a vehicle in which the system 300 is disposed.

The SOC 316 may include one or more processor cores 318, a computer-readable memory 320, one or more input/output (I/O) devices 322, one or more peripheral devices 324, and one or more subsystems 326, which may each receive power from respective DC-DC converters 338, where each of the DC-DC converters 338 are coupled to receive the voltage output by the DC-DC converter 306. The voltage VOUT generated by the LDO regulator 100 may be provided to converter drivers 331, which are configured to drive respective converters of the DC-DC converters 338.

Each of the processor cores 318 of the SOC 316 may include at least one central processing unit (CPU) and a local cache memory. In one or more embodiments, the memory 320 may be a system memory of the SOC 316 that is connected to the processor cores 318, the I/O devices 322, the peripheral devices 324, and/or the subsystems 326 via one or more interconnects or communications busses (not shown). The memory 320 may include computer-readable instructions for operating system that may be executed by the processor cores 318 as well as other software associated with tasks performed by the SOC 316.

The I/O devices 322 may include I/O devices for applications provided by the SOC 316, such as a display, a touch screen input device, and one or more network ports, as non-limiting examples. The peripheral devices 324 may include circuitry configured to perform flash memory management, power management, interconnect management, and physical layer tasks (e.g., universal serial bus (USB) functionality), as non-limiting examples.

The system 300 may include sensors 332 (e.g., air-flow sensors, pressure sensors, temperature sensors, fuel sensors, speed sensors, voltage sensors, and/or proximity sensors, as non-limiting examples) that receive power from one or more of the DC-DC converters 338. The system 300 may include motor drivers 334 configured to drive one or more electric motors configured to convert electrical power to torque in order to turn the wheels of a vehicle that includes the system 300. The motor drivers 334 may receive power from one or more of the DC-DC converters 338.

As described above, the LDO regulator 100 may include current limiter circuitry 110 that includes a current limiting transistor (e.g., the current limiting transistor 108 of FIG. 1). As described above, in a startup state, beginning at initiation of ramp-up of the battery 304 for example, logic circuitry (e.g., the logic circuitry 112 of FIG. 1) of the LDO regulator 100 may control the current limiter circuitry 110 to configure a current limiting transistor (e.g., the current limiting transistor 108 of FIG. 1) as a diode-connected transistor, where the current limiting transistor limits the current through a pass transistor (e.g., the pass transistor 106 of FIG. 1) of the LDO regulator 100. In a subsequent current regulation state, the logic circuitry may configure the current limiter circuitry 110 such that the current limiting transistor is no longer configured as a diode-connected transistor and is instead included in a current control loop (e.g., the current control loop 201 of FIG. 2), while continuing to limit the current through the pass transistor. In this way, a single set of current limiter circuitry 110 is used to limit current through the pass transistor of the LDO regulator 100 both before (in the startup state) and after (in the current regulation state) activation of an error amplifier of the LDO regulator 100.

Figure 4:
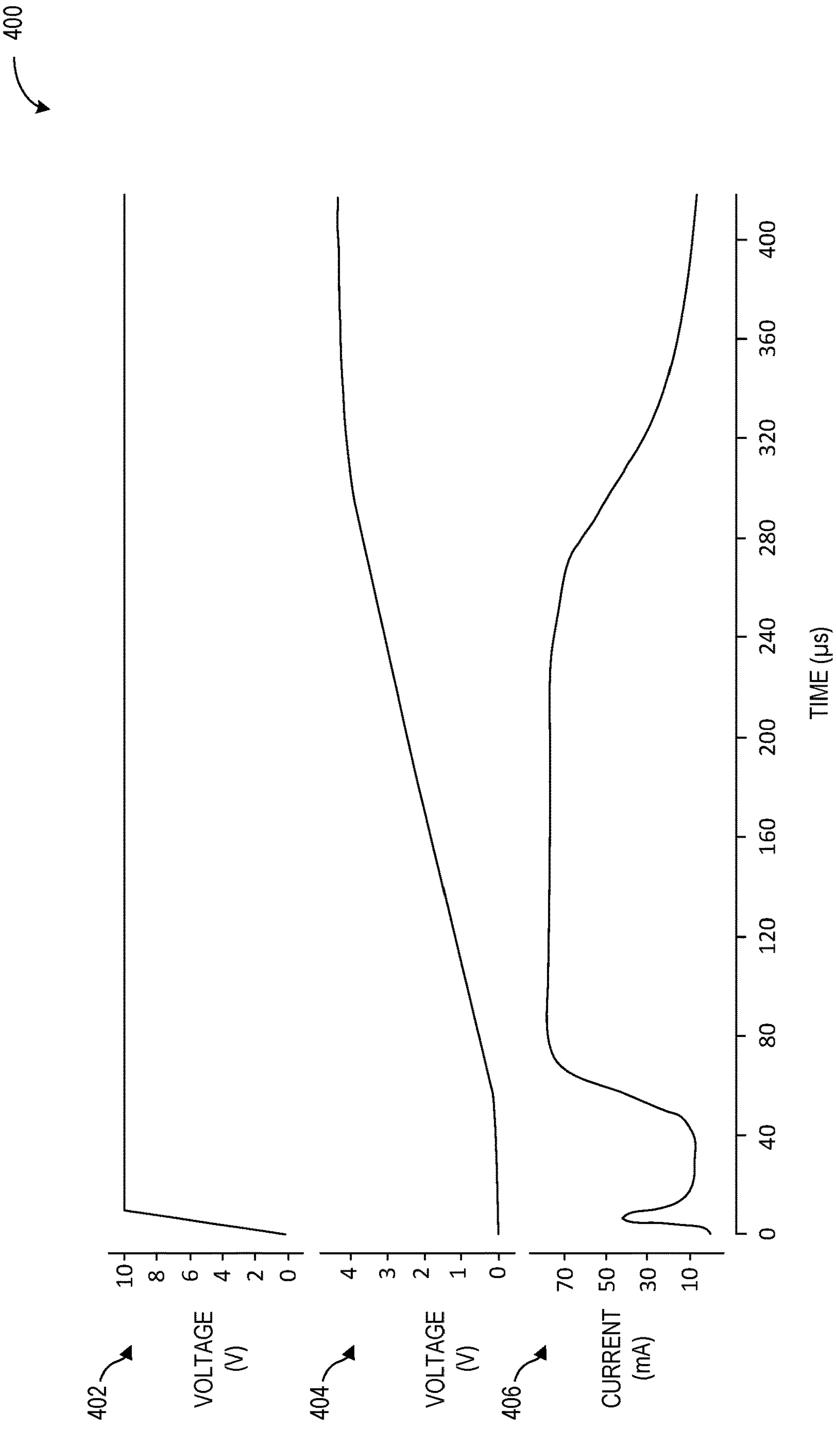
FIG. 4 is a chart illustrating battery voltage, LDO regulator output voltage, and LDO regulator output current at startup of a conventional LDO regulator system.
Figure 5:
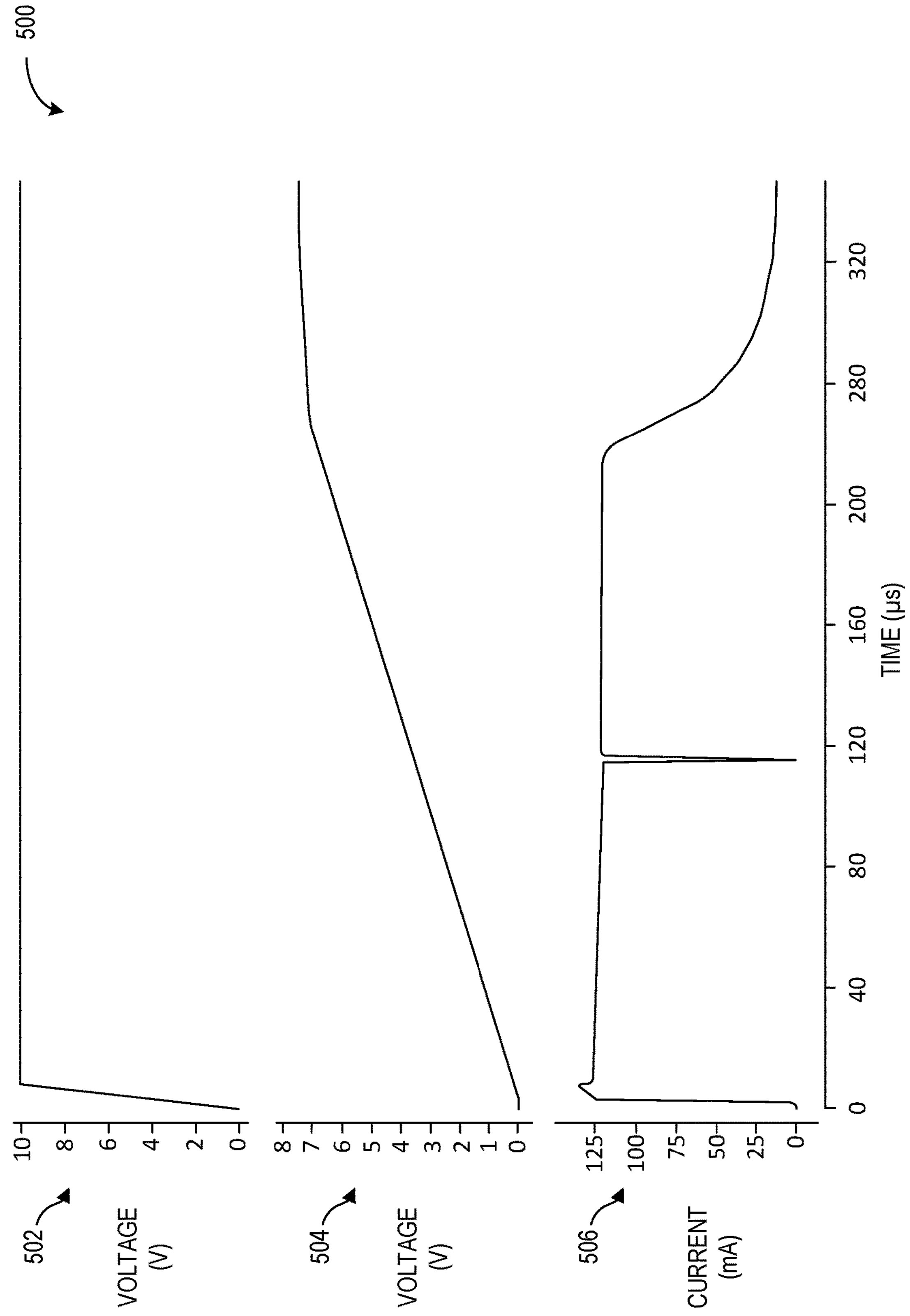
FIG. 5 is a chart illustrating battery voltage, LDO regulator output voltage, and LDO regulator output current at startup of the LDO regulator of FIG. 1, in accordance with various embodiments.

FIG. 4 shows a chart 400 representing transient current and voltage behavior in startup and current regulation states for a conventional voltage regulator that includes separate dedicated circuitries for current protection in the startup state and for current protection in the current regulation state, respectively. FIG. 5 shows a chart 500 representing transient current and voltage behavior in startup and current regulation states for a voltage regulator (e.g., an embodiment of the LDO regulator 100 of FIGS. 1 and 2) that includes current limiter circuitry (e.g., an embodiment of the current limiter circuitry 110 of the LDO regulator 100 of FIGS. 1 and 2) that is configurable to provide current protection in both a startup state and a current regulation state. Here, the charts 400 and 500 of FIGS. 4 and 5 are described concurrently for ease of comparison. In the present example, the chart 500 is described with reference to the current limiter circuitry 110 of the LDO regulator 100 of FIGS. 1 and 2.

The chart 400 includes a sub-chart 402 representing battery voltage for a battery supplying a conventional voltage regulator, a sub-chart 404 representing regulator output voltage for the conventional voltage regulator, and a sub-chart 406 representing regulator output current for the conventional voltage regulator. The chart 500 includes a sub-chart 502 representing battery voltage for a battery supplying the LDO regulator 100 (e.g., VBAT), a sub-chart 504 representing regulator output voltage (e.g., VOUT) for the LDO regulator 100, and a sub-chart 406 representing regulator output current for the LDO regulator 100. The time scale is the same for each of the sub-charts 402, 404, and 406 of the chart 400. The time scale is the same for each of the sub-charts 502, 504, and 506 of the chart 500.

The battery voltage ramps represented the sub-chart 402 in the chart 400 and in the sub-chart 502 of the chart 500 are the same or substantially the same, with each battery voltage ramping up to 10 V in around 10 μs. As shown in the sub-chart 406, the regulator output current of the conventional voltage regulator requires around 60 μs to rise to a current limit of around 70 mA. In contrast, as shown in the sub-chart 506, the regulator output current of the LDO regulator 100 rises to a current limit of around 120 mA in around 3 μs. That is, the current ramp-up of the LDO regulator 100 is not only faster than that of the conventional voltage regulator, but it is also completed prior to completion of the battery voltage ramp-up. The faster current ramp-up at the output of the LDO regulator 100 results in a faster ramp-up of the regulator output voltage for the LDO regulator 100 compared to the conventional voltage regulator, as shown in sub-charts 404 and 504 in which the regulator output voltage ramp-up begins at around 3 μs for the LDO regulator 100 and begins at around 60 μs for the conventional voltage regulator.

In one or more embodiments, the comparatively quicker current ramp-up in the LDO regulator 100 is attributable, at least in part, to the use of the BJT 206 and the resistor 220 as a current source in the current limiter circuitry 110 of the LDO regulator 100, and further attributable to the configuration of the current limiting transistor 108 as a diode-connected transistor during the startup state, where that the current limiting transistor 108 requires a relatively low battery voltage to drive current to the output node 126.

Figure 6:
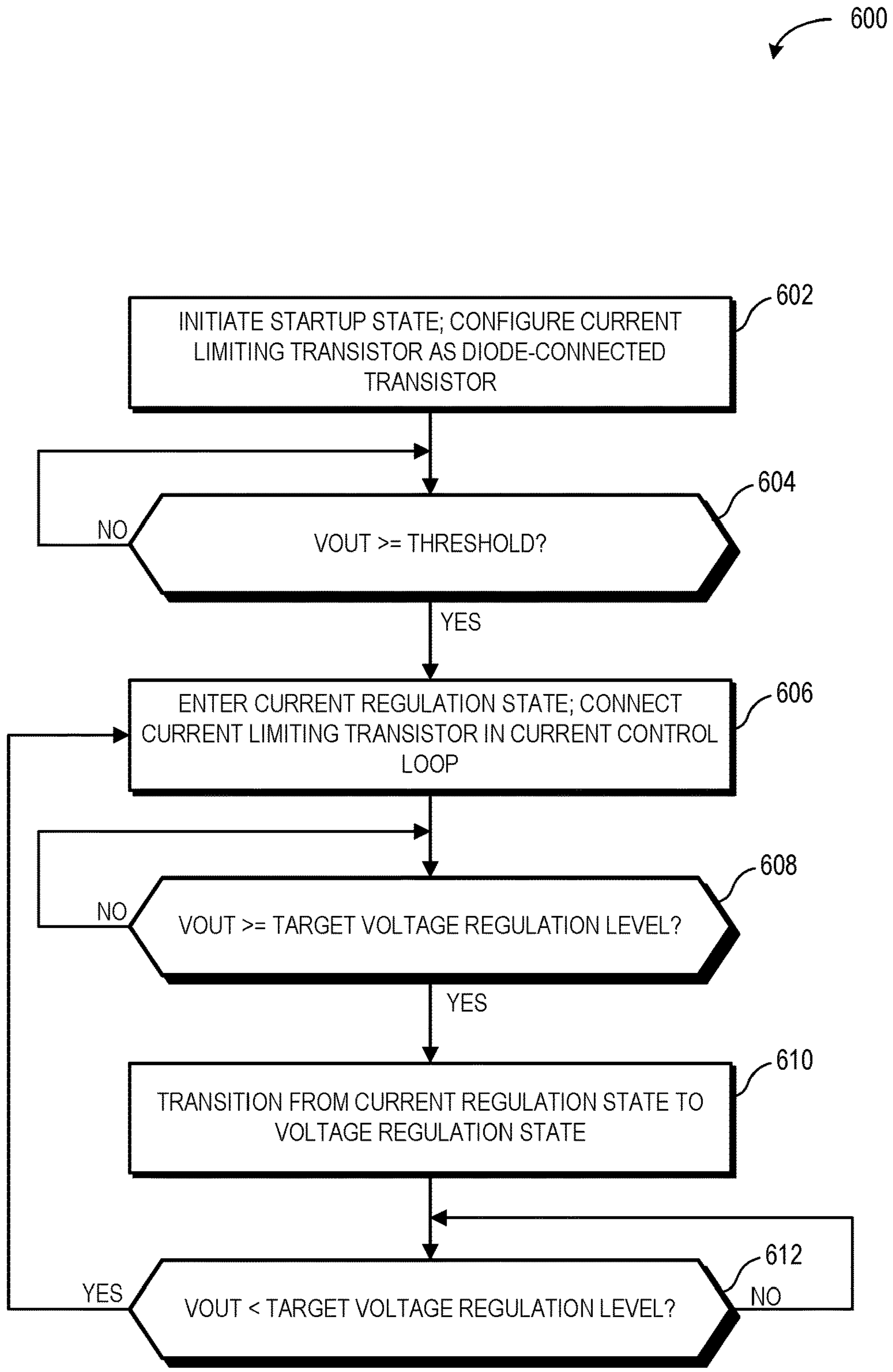
FIG. 6 is a process flow diagram illustrating a method of configuring current limiter circuitry of a voltage regulator through various state transitions, in accordance with various embodiments.

FIG. 6 shows an illustrative process flow for a method 600 for controlling state transitions of a voltage regulator, such as the LDO regulator 100 of FIGS. 1 and 2, and for modifying a configuration of current limiter circuitry (e.g., the current limiter circuitry 110 of FIGS. 1-3) in various states. In the present example, the method 600 is described with reference to the LDO regulator 100 of FIGS. 1 and 2 and elements thereof.

At block 602, the LDO regulator 100 initiates a startup state. In one or more embodiments, the initiation of the startup state of the LDO regulator 100 may coincide with initiation of ramp-up of the output voltage of a battery coupled to the input node 122 of the LDO regulator 100 (e.g., the battery 304 of FIG. 3). In the startup state, the logic circuitry 112 may configure the current limiter circuitry 110 (e.g., opening the switch 202 and closing the switch 204), causing the current limiting transistor 108 to be configured as a diode-connected transistor (e.g., connecting the gate terminal of the current limiting transistor 108 to the drain terminal of the current limiting transistor 108). The constant current source 205 of the current limiter circuitry 110 may drive a reference current through the current limiting transistor 108, which may control (i.e., limit) the current through the pass transistor 106. In one or more embodiments, the constant current source 205 may provide the constant current to the current limiting transistor 108 via a current mirror (e.g., the transistors 208 and 210). The current through the pass transistor 106 and the current limiting transistor 108 may charge the output capacitor 114 in the startup state, causing the output voltage VOUT to rise.

At block 604, the logic circuitry 112 monitors the output voltage VOUT while the LDO regulator 100 is in the startup state. In response to the logic circuitry 112 determining that the output voltage VOUT is less than a threshold voltage (e.g., around 3 V, as a non-limiting example), the method 600 stays at block 604 for continued monitoring of the output voltage VOUT by the logic circuitry 112. In response to determining that the output voltage VOUT is greater than or equal to the threshold voltage, the method 600 proceeds to block 606.

At block 606, the LDO regulator 100 transitions from the startup state to a current regulation state. In the current regulation state, the logic circuitry 112 may change the configuration of the current limiter circuitry 110 (e.g., closing the switch 202 and opening the switch 204), causing the current limiting transistor 108 to no longer be configured in a diode-connected transistor state (i.e., disconnecting the gate terminal and drain terminals of the current limiting transistor 108, and connecting the current limiting transistor 108 as part of the current control loop 201. In the current regulation state, the output voltage VOUT may be sufficiently high to activate the charge pump 104 and, in turn, the error amplifier 102, and the error amplifier 102 may begin attempting to regulate the output voltage VOUT to a target voltage regulation level. In one or more embodiments, the constant current source 205 of the current limiter circuitry 110 may continue to drive the reference current through the current limiting transistor 108 in the current regulation state, to control (i.e., limit) the current through the pass transistor 106.

At block 608, while the output voltage VOUT is less than a target voltage regulation level (e.g., around 5 V, as a non-limiting example), the method 600 stays at block 608 for continued monitoring of the output voltage VOUT. If the output voltage VOUT becomes greater than or equal to the target voltage regulation level, the method 600 proceeds to block 610.

At block 610, the LDO regulator 100 transitions from the current regulation state to the voltage regulation state. In the voltage regulation state, the error amplifier 102 actively adjusts the gate voltage of the pass transistor 106 to regulate the output voltage VOUT at a target regulation voltage level, while the current limiter circuitry 110 continues to limit the current through the pass transistor 106 (e.g., via the current limiting transistor 108 in the current control loop 201). The current loop 201 may be disabled during the voltage regulation state.

At block 612, if the output voltage VOUT drops below the target regulation voltage level (e.g., by more than a predetermined margin), the method 600 may return to block 606 (i.e., the LDO regulator 100 may return to the current regulation state).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with) another element, and not necessarily mechanically. Thus, although the schematic shown in the figures depict one exemplary arrangement of elements, additional intervening elements, devices, features, or components may be present in one or more embodiments of the depicted subject matter. Furthermore, the term "amplifier" used herein should be understood to refer to a "power amplifier" unless noted otherwise.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A voltage regulation circuit comprising:
- an error amplifier configured to provide an error signal based on a comparison of a reference voltage and a voltage at a first voltage divider coupled to an output node of the voltage regulation circuit;
- a pass transistor configured to selectively pass current from an input node to the output node based, at least in part, on the error signal;
- current limiter circuitry comprising a current limiting transistor that is configured to limit electrical current through the pass transistor; and
- logic circuitry configured to:
  - configure the current limiting transistor as a diode-connected transistor in a first state; and
  - configure the current limiting transistor as part of a current control loop in a second state.

2. The voltage regulation circuit of claim 1, wherein the first state is a startup state in which an output voltage at the output node is less than a predetermined threshold voltage.

3. The voltage regulation circuit of claim 2, wherein the error amplifier is disabled during the startup state.

4. The voltage regulation circuit of claim 1, wherein the current limiter circuitry further comprises:
- a first switch coupled between a gate terminal of the current limiting transistor and a drain terminal of the current limiting transistor, wherein the logic circuitry is configured to close the first switch in the first state and to open the first switch in the second state.

5. The voltage regulation circuit of claim 4, wherein the current control loop comprises:
- a first transistor coupled between the input node and the current limiting transistor;
- a second transistor coupled between the current limiting transistor and a reference node;
- a second voltage divider coupled between the input node and the output node, wherein a gate terminal of the second transistor is connected to an intermediate node of the second voltage divider; and
- a third transistor coupled between the input node and the voltage divider, wherein a gate terminal of the third transistor is connected to respective drain terminals of the first transistor and the current limiting transistor.

6. The voltage regulation circuit of claim 5, wherein the current limiter circuitry further comprises:
- a second switch coupled between the second transistor and the reference node, wherein the logic circuitry is configured to open the second switch in the first state and close the second switch in the second state.

7. The voltage regulation circuit of claim 6, wherein the logic circuitry is configured to transition from the first state to the second state in response to determining that the output voltage at the output node is greater than a predetermined threshold voltage.

8. The voltage regulation circuit of claim 6, wherein the current limiter circuitry further comprises:
- a current mirror that includes the second transistor of the current control loop and a fourth transistor; and
- a constant current source configured to provide a constant current through the fourth transistor, wherein the constant current source comprises:
  - a bipolar junction transistor (BJT) coupled between the input node and the reference node; and
  - a resistor connected between a base terminal of the BJT and the reference node.

9. A low-dropout regulator comprising:
- a first transistor coupled between an input node and an output node;
- an amplifier configured to control the first transistor based on an output voltage at the output node and a reference voltage;
- current limiter circuitry comprising a second transistor that is configured to limit electrical current through the first transistor; and
- logic circuitry configured to:
  - configure the second transistor as a diode-connected transistor in a first state; and
  - connect the second transistor to a current control loop in a second state.

10. The low-dropout regulator of claim 9, wherein the amplifier is disabled during the first state.

11. The low-dropout regulator of claim 10, wherein the current limiter circuitry further comprises:
- a first switch coupled between a gate terminal of the second transistor and a drain terminal of the second transistor, wherein the logic circuitry is configured to close the first switch in the first state and to open the first switch in the second state.

12. The low-dropout regulator of claim 11, wherein the current control loop comprises:
- a third transistor coupled between the input node and the second transistor;
- a fourth transistor coupled between the second transistor and a reference node;
- a voltage divider coupled between the input node and the output node, wherein a gate terminal of the fourth transistor is connected to an intermediate node of the voltage divider; and
- a fifth transistor coupled between the input node and the voltage divider, wherein a gate terminal of the fifth transistor is connected to respective drain terminals of the third transistor and the second transistor.

13. The low-dropout regulator it of claim 12, wherein the current limiter circuitry further comprises:

a second switch coupled between the fourth transistor and the reference node, wherein the logic circuitry is configured to open the second switch in the first state and close the second switch in the second state.

14. The low-dropout regulator of claim 13, wherein the logic circuitry is configured to transition from the first state to the second state in response to determining that the output voltage at the output node is greater than a predetermined threshold voltage.

15. The low-dropout regulator of claim 13, wherein the current limiter circuitry further comprises:

a current mirror that includes the fourth transistor of the current control loop and a sixth transistor; and a constant current source configured to provide a constant current through the sixth transistor, wherein the constant current source comprises:

a bipolar junction transistor (BJT) coupled between the input node and the reference node; and a resistor connected between a base terminal of the BJT and the reference node.

16. A method comprising:

configuring, by logic circuitry of a low-dropout regulator in a first state, a current limiting transistor as a diode-connected transistor;

configuring, by the logic circuitry in a second state, the current limiting transistor to be included in a current control loop without being configured as a diode-connected transistor; and limiting, by the current limiting transistor in the first state and in the second state, current through a pass transistor coupled between an input node of the low-dropout regulator and an output node of the low-dropout regulator.

17. The method of claim 16, further comprising:

transitioning, by the logic circuitry, from the first state to the second state in response to determining that an output voltage of the low-dropout regulator is greater than a predetermined threshold voltage.

18. The method of claim 17, wherein configuring the current limiting transistor as a diode-connected transistor comprises:

closing, by the logic circuitry a first switch that is connected between a gate terminal of the current limiting transistor and a drain terminal of the current limiting transistor.

19. The method of claim 18, wherein configuring the current limiting transistor to be included in a current control loop without being configured as a diode-connected transistor comprises:

opening, by the logic circuitry, the first switch; and closing, by the logic circuitry, a second switch that is connected between at least one transistor of the current control loop and a reference node.

20. The method of claim 19, further comprising:

providing, by a constant current source coupled between the input node and the output node, a constant current through the current limiting transistor in the first state and in the second state via a current mirror.

* * * * *